(12) United States Patent
Naito et al.

(10) Patent No.: US 9,209,564 B2
(45) Date of Patent: Dec. 8, 2015

(54) CARD CONNECTOR

(75) Inventors: Yuji Naito, Yamato (JP); Mitsuhiro Tomita, Yamato (JP)

(73) Assignee: Molex, LLC, Lisle, IL (US)

( * ) Notice: Subject to any disclaimer, the term of this patent is extended or adjusted under 35 U.S.C. 154(b) by 51 days.

(21) Appl. No.: 13/879,948

(22) PCT Filed: Nov. 23, 2011

(86) PCT No.: PCT/US2011/062000
§ 371 (c)(1),
(2), (4) Date: Jun. 19, 2013

(87) PCT Pub. No.: WO2012/071489
PCT Pub. Date: May 31, 2012

(65) Prior Publication Data
US 2014/0148033 A1 May 29, 2014

(30) Foreign Application Priority Data
Nov. 25, 2010 (JP) .................... 2010-262417

(51) Int. Cl.
*H01R 12/57* (2011.01)
*H01R 13/631* (2006.01)
*G06K 7/00* (2006.01)
*G06K 13/08* (2006.01)

(52) U.S. Cl.
CPC ............ *H01R 13/631* (2013.01); *G06K 7/0047* (2013.01); *G06K 13/0856* (2013.01)

(58) Field of Classification Search
CPC ............... H01R 13/6658; H01R 12/57; H01R 13/6582; H01R 2201/06
USPC ................................... 439/157, 630
See application file for complete search history.

(56) References Cited

U.S. PATENT DOCUMENTS

| 5,967,845 | A | 10/1999 | Ho et al. | |
|---|---|---|---|---|
| 6,511,350 | B1 * | 1/2003 | Ito et al. | 439/680 |
| 7,335,064 | B2 | 2/2008 | Matsukawa et al. | |
| 7,686,633 | B2 * | 3/2010 | Yu et al. | 439/188 |
| 2002/0094726 | A1 * | 7/2002 | Akagi et al. | 439/630 |

(Continued)

FOREIGN PATENT DOCUMENTS

| JP | 2003-229204 A | 8/2003 |
|---|---|---|
| JP | 2004-031205 A | 1/2004 |

(Continued)

OTHER PUBLICATIONS

International Search Report for PCT/US2011/062000.

*Primary Examiner* — Truc Nguyen

(57) ABSTRACT

A card connector includes a housing that houses a card provided with a terminal member, a connection terminal that attaches to the housing and contacts the terminal member of the card, a cover member that attaches to the housing and forms a card housing space between the housing, wherein the cover member is provided with a locking member to lock the card housed within the card housing space; the locking member is a leaf spring member with a cantilever form, and provides a locking main body part integrally connected to the cover member and which extends in the insertion direction of the card, and a locking ridged part connected to the tip of the locking main body part, and which protrudes inward toward the cover member; and the locking ridged part inserts into a recessed part formed on the edge of the card housed in the card housing space.

20 Claims, 9 Drawing Sheets

(56) References Cited

U.S. PATENT DOCUMENTS

2009/0142948 A1* 6/2009 Yu et al. .................. 439/135
2009/0197445 A1* 8/2009 Kobayashi et al. ........... 439/153
2010/0267267 A1* 10/2010 Zhou et al. .................... 439/328
2012/0276780 A1* 11/2012 Hu et al. ....................... 439/630

FOREIGN PATENT DOCUMENTS

| JP | 2008-181792 | 8/2008 |
| JP | 2009-146701 | 7/2009 |
| JP | 2010-165139 | 7/2010 |

* cited by examiner

CARD CONNECTOR

REFERENCE TO RELATED APPLICATIONS

The Present Disclosure claims priority to prior-filed Japanese Patent Application No. 2010-262417, entitled "Card Connector," filed on 25 Nov. 2010 with the Japanese Patent Office. The content of this Patent Application is fully incorporated in its entirety herein.

BACKGROUND OF THE PRESENT DISCLOSURE

The Present Disclosure relates, generally, to a card connector.

Conventional electronic devices may be provided with a card connector in order to use various memory cards. In some cases, conventional card connectors generally have a push/push structure from a perspective of easy handling so as to press-in a memory card to insert and remove the memory card. An example is disclosed in Japanese Patent Application No. 2009-146701.

FIG. 9 also illustrates a conventional card connector. In the drawing, 811 is a housing for a card connector composed of an insulating material, and is provided with a plurality of connection terminals 851 composed of metal. Further, 861 is a card connector shell composed of a metallic sheet, and which is mounted on the upper side of the housing 811. Furthermore, a memory card 901 is inserted between the shell 861 and the housing 811, and made to contact with the connection terminals 851 that correspond to a contact pad 951 of the memory card 901.

As is shown, the card connector is a push/push type connector which has a guide mechanism to eject the memory card 901. The guide mechanism is provided with a sliding member 821 engaged with the memory card 901 so that it slides with the memory card 901, and also a coil spring 881 that biases the sliding member 821 in the direction of ejecting the memory card 901. Moreover, a cam groove of the heart cam mechanism is formed on the upper surface of the sliding member 821, and one end of a pin member 871 of the heart cam mechanism is engaged with the cam groove. In addition, the pin member 871 is held by being biased downward from the top by a leaf spring 865 of the shell 861. Further, the sliding member 821 is provided with a lever 822 where an engaging part 823 that is engaged with an engaging recess part 912 of the memory card 901.

When the memory card 901 is pushed into the housing 811, the memory card 901 is pressed in the inward direction (upper right direction in the drawing) of the housing 811. Subsequently, the engaging recess part 912 of the memory card 901 is engaged with the engaging part 823 of the lever 822 of the sliding member 821, and the sliding member 821 resists the repulsive force of the coil spring 881 and moves in the inward direction of the housing 811 with the memory card 901. Then, when the sliding member 821 stops due to one end of the pin member 871 being latched to the cam groove of the heart cam mechanism by an operation of the heart cam mechanism, the memory card 901 also stops in an inserted state within the housing 811.

When the memory card 901 removed from the housing 811, the state where one end of the pin member 871 is latched to the cam groove of the heart cam mechanism is released by being pushed. Accordingly, the sliding member 821 is freed and moves in the near side direction (left lower direction in the drawing) with the memory card 901 due to the force exhibited by the coil spring 881 so that the memory card 901 is ejected from the housing 811.

However, the conventional card connector requires installation of components to the housing 811 such as the sliding member 821, lever 822, pin member 871, coil spring 881 and the like to compose the guide mechanism. Therefore, the construction is complicated, the number of parts is increased, and the cost also increases. Further, the width of the housing 811 is wider by providing the guide mechanism for the memory card 901 causing the overall size of the card connector to increase as a result.

Accordingly, a card connector that omits the card guide mechanism has been proposed in recent years to reduce the size and price in conjunction with lower prices and smaller electronic devices. However, if the card guide mechanism is omitted and a user tries to press the card into the housing with a finger, it would be difficult to securely hold the card inside the housing. Consequently, for example, when an electronic device that mounts a card connector receives an impact, there is a risk of the card slipping out of place causing a contact failure between the contact pad and the connection terminal, or the entire card could slip out from the card connector.

SUMMARY OF THE PRESENT DISCLOSURE

An object of the Present Disclosure is to provide a reliable card connector that can solve the problems in the conventional card connectors, securely hold the card with a simple construction, has a small size, easy manufacturing, and low cost.

Therefore, the card connector of the Present Disclosure includes a housing that houses a card provided with a terminal member, a connection terminal that attaches to the housing and contacts the terminal member of the card, a cover member that attaches to the housing and forms a card housing space between the housing, wherein the cover member is provided with a locking member to lock the card housed within the card housing space; the locking member is a leaf spring member with a cantilever form, and provides a locking main body part integrally connected to the cover member and which extends in the insertion direction of the card, and a locking ridged part connected to the tip of the locking main body part, and which protrudes inward toward the cover member; and the locking ridged part inserts into a recessed part formed on the edge of the card housed in the card housing space.

In another card connector of the Present Disclosure, the locking ridged part includes a locking part extending in an orthogonal direction to the insertion direction of the card, and the locking part opposes a surface near the front end of the card in the recessed part.

Further, in another card connector of the Present Disclosure, the surface near the front end of the card in the recessed part extends in an orthogonal direction to the side edge of the card.

Further still, in another card connector of the Present Disclosure, the locking member is provided with an operating part that is connected to the tip of the locking ridged part, and a portion of the operating part protrudes more outward than the locking main body part and the locking ridged part.

Further, in another card connector of the Present Disclosure, the locking member is further formed on a side panel part of the cover member, and the locking main body part and locking ridged part are flush with the side panel part.

Further, in another card connector of the Present Disclosure, the locking member is further formed on the top panel part of the cover member, and the locking main body part and the locking ridged part are flush with the top panel part.

Accordingly, the card connector of the Present Disclosure can securely hold the card with a simple construction, a small size, easy manufacturing, low cost and excellent reliability.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
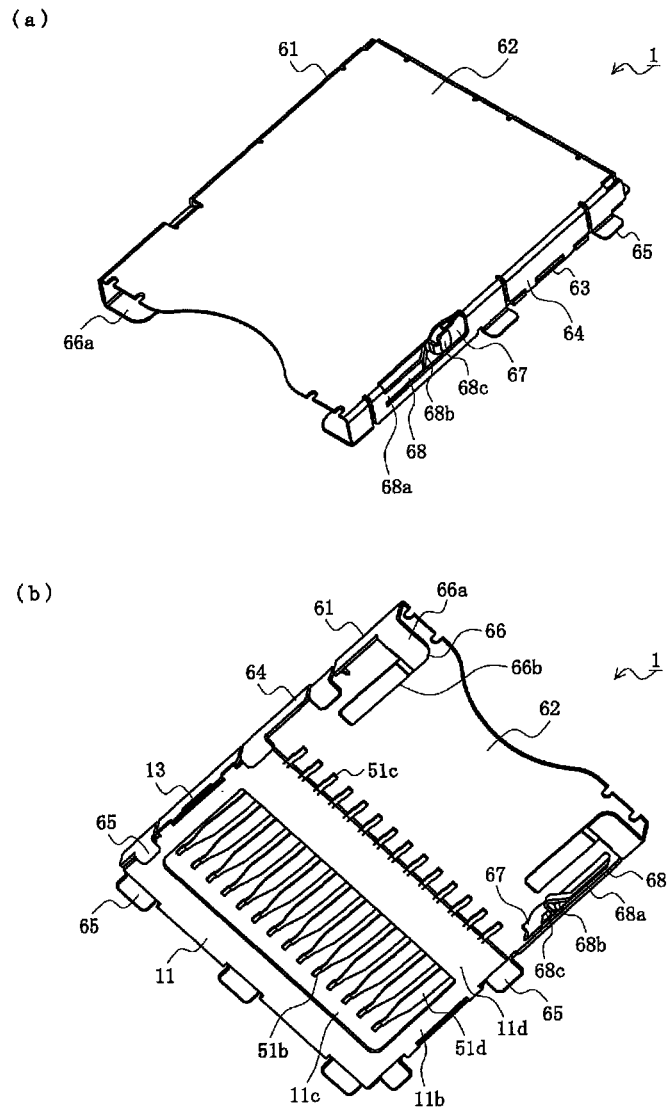
FIG. 1 is a perspective view illustrating a card connector according to the Present Disclosure, wherein (a) is a diagonal view from above, and (b) is a diagonal view from below.

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the drawings, 1 is a card connector according to the present embodiment that attaches to an electronic device (not illustrated). A card 101 is inserted into the card connector 1, and the card 101 is loaded into the electronic device through the card connector 1. The electronic device may be any type of device, such as a personal computer, cellular phone, a personal digital assistant, camera, music player, game console, mobile navigation system or the like. Further, the card 101 may be any kind of memory card.

Figure 3:
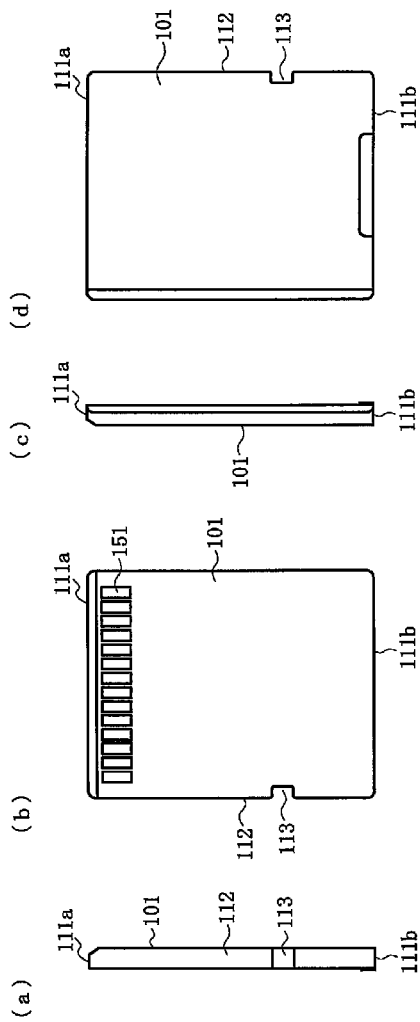
FIG. 3 is four orthogonal views of a card inserted in the card connector of FIG. 1, wherein (a) is a right side surface view, (b) is a bottom surface view, (c) is a left side surface view and (d) is a top surface view.

In the present embodiment, the card 101 has a nearly rectangular shape overall as illustrated in FIG. 3, and a contact pad 151 is arranged as a plurality of terminal members so as to be in line along a front end 111a on the bottom surface near the front end 111a. Further, at least one recessed part 113 is formed in the latter portion (a part nearer to the rear end 111b than the middle point between the front end 111a and the rear end 111b) in at least one side of the side edges 112 that joins the front end 111a with the rear end 111b. For convenience, a description will be given of an example where only one recessed part 113 is formed in the latter part in the right side edge 112.

Here, the card connector 1 is provided with a housing 11 formed integrally of an insulating material, a terminal 51 as a plurality of connection terminals attached to the housing 11, and formed integrally by stamping a plate material composed of insulating material and undergoing a process for folding or the like, and a shell 61 as the cover member attached to the upper side of the housing 11, and formed integrally by stamping a plate material composed of insulating material and undergoing a process for folding or the like.

The shell 61 covers the housing 11 and the upper side of at least one part of the card 101 housed in the housing 11. The card connector 1 is a roughly flat rectangular parallelepiped shape that attaches to the electronic device. The card 101 is inserted into the card housing space formed between the housing 11 and the shell 61 from the front side (lower left side in FIG. 1(a), and upper right side in FIG. 1(b)).

Further, the terminals 51 are typically integrated with the housing 11 by overmolding. In other words, the housing 11 is formed by filling resin in the cavity of a mold prepared inside in advance.

Figure 2:
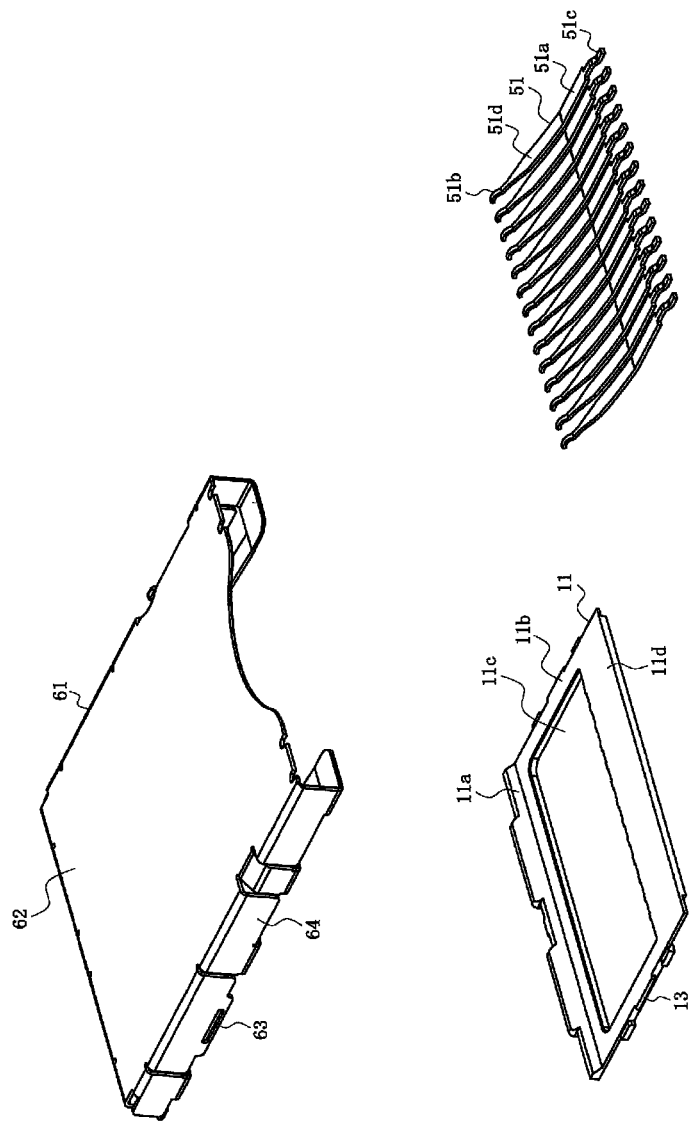
FIG. 2 is an exploded view of the card connector of FIG. 1.

As shown, the housing 11 includes a bottom wall part 11b with a nearly rectangular plate-like form, and a back wall part 11a installed from the bottom wall part 11b, and extends along the edge of the back side (left upper side in FIG. 2) in the back part of the bottom wall part 11b. Here, the bottom wall part 11b is provided with a terminal retention part 11d where the terminals 51 are attached as the connection terminal to the top surface. The terminals 51 may be integrated with the terminal retention part 11d by overmolding; however, a plurality of terminal load grooves may be formed on the top side of the terminal retention part 11d so as to extend in the front-back direction (direction that connects the upper left and lower right in FIG. 2), and the terminals 51 may be inserted and attached in each terminal loading groove.

The terminals 51 are elongated strip-shaped members extending parallel to each other in the front-back direction, and arranged in parallel so as not to contact each other between adjacent terminals. Each terminal 51 includes a body 51a extending in the front-back direction, an arm part 51d extending forward from the front end of the body 51a, a contact part 51b connecting to the tip of the arm part 51d, and a tail part 51c as the solder tail part extending backward from the back end of the body 51a.

Also, for the terminal 51, the main body part 51a is attached to the terminal retention part 11d, the arm part 51d extends diagonally upward towards the back wall part 11a, and the contact part 51b that is connected to the tip of the arm part 51d protrudes upward from the top surface of the bottom wall part 11b. The contact part 51b of each terminal 51 is electrically connected by contacting to the contact pad 151 that corresponds to the bottom surface of the card 101. Further, the tail part 51c protrudes towards the front side (from the lower left to the upper right direction in FIG. 1) from the edge of the front side of the bottom wall part 11b, and is electrically connected to a counter-terminal member such as a signal wire, contact pad, terminal or the like formed on the circuit board or the like by soldering or the like. The arm part 51d functions as the cantilever leaf spring member to bias contact part 51b elastically upward. Therefore, the contact part 51b is suppressed by the contact pad 151 of the card 101, so contact between the contact part 51b and the contact pad 151 is securely maintained.

Furthermore, an opening 11c that passes through across the thickness of the bottom wall part 11b is formed in a part that corresponds to the lower side of the arm part 51d and the contact part 51b in the bottom wall part 11b. In addition, the opening 11c can be omitted as necessary.

Further, the shell 61 includes a top panel part 62 in a roughly rectangular shape, and a plurality of side panel parts 64 installed from side edges in a plurality of locations (more specifically, both side edges and the back side edge) of the top panel part 62. A plurality of latch openings 63 are formed on the side panel parts 64, as illustrated in FIG. 1, when the shell 61 is attached to the upper side, the latch opening 63 is latched to the latching projection 13 formed on the outer surface of the bottom wall part 11b of the housing 11 so that the shell 61 is fixed to the housing 11.

Also, a plurality of anchoring tabs 65 extend from the lower edge of the side panel part 64 parallel with the top panel part 62. At least one of the anchoring tabs 65 is anchored to the anchoring pad connected to the heat dissipation plate or the like, or a ground wire formed on the circuit board or the like by soldering or the like. Further, some of the anchoring tabs 65 extend outward of the shell 61, and other anchoring tabs 65 extend inward of the shell 61. The anchoring tabs 65 extending inward of the shell 61 abut the bottom surface of the bottom wall part 11b of the housing 11 to demonstrate the function for anchoring the shell 61 to the housing 11.

In addition, the top panel part 62 of the shell 61 is typically bigger than the bottom wall part 11b of the housing 11 and nearly the same size as the top surface of the card 101. In the example illustrated in the figures, the top panel part 62 of the shell 61 has approximately twice the area of the bottom wall part 11b of the housing. Also, the shell 61 is installed on the upper side of the housing 11 so that the side panel part 64 installed from the back side edge of the top panel part 62 abuts the outer surface of the back wall part 11a. In other words, the back side edge of the top panel part 62 and the back side edge of the bottom wall part 11b nearly match. Accordingly, the configuration is such that there is no housing 11 at the lower side portion of about the front half of the top panel part 62.

Also, a card retention tab 66 is connected to the side panel part 64 in the front end of the shell 61. A base part 66a of the card retention tab 66 extends from the lower edge of the side panel part 64 to inward of the shell 61 parallel to the top panel part 62, and a supporting arm tab 66b extends from the front edge side of the base part 66a towards the back wall side. The supporting arm tab 66b is a cantilever leaf spring member with elasticity, and extends diagonally upward toward the back wall side. In addition, the base part 66a may be anchored by soldering or the like, in a similar manner as the anchoring tab 65, to the anchoring pad that is connected to a ground wire, radiator plate or the like formed on the circuit board or the like in the electronic device.

Accordingly, the tip of the supporting arm tab 66b biases the bottom surface of the card 101 inserted in the card housing space between the housing 11 and the shell 61, elastically upward, so the bottom surface of the card 101 is pressed-in to the top panel part 62 of the shell 61, and the disposition of the card 101 in the card housing space is stabilized. Furthermore, the shell 61 is provided with at least one locking member 68 formed on at least one side of the side panel parts 64 of the left and right sides. For convenience, a description will be given only for an example where only one locking member 68 is formed on the right side panel 64. The locking member 68 is provided with a locking main body 68a that is a cantilever leaf spring member formed by cutting and bending a part of the side panel part 64, and its base edge part is integrally connected to the side panel part 64 and extends toward the back wall part 11a side (in the insertion direction of the card 101); a locking ridged part 68b formed by bending so as to protrude toward the inside of the shell 61 and is connected to the tip of the locking main body 68a; and a plate-shaped operating part 68c that is connected to the tip of the locking ridged part 68b. The operating part 68c is preferably formed so as to be almost flush with the locking main body 68a. Accordingly, because the operating part 68c does not protrude from the side surface of the card connector, size reduction is possible without increasing the width of the card connector 1, and the processing of the locking member 68 is even easier. In addition, the periphery of the locking member 68 is made of the opening 67 where a portion of the shell 61 is removed. Also, the locking member 68 is elastically displaced in an orthogonal direction to the side panel part 64.

Accordingly, the locking ridged part 68b of the locking member 68 is engaged by fitting into the recessed part 113 formed in the side edge 112 of the card 101 that is inserted in the card housing space between the housing 11 and the shell 61. Therefore, the card 101 can be securely locked and held.

As illustrated in (d) in FIGS. 4-6 and FIG. 7(b), the locking ridged part 68b of the locking member 68 formed in the shell 61 is provided with a locking part 68b1 that is nearly orthogonal to the locking main body 68a, and the surface of the operating part 68c and a sloping part 68b2 extending in the sloping direction toward the surface. The shape viewed from above is nearly a right triangle. In the right triangle, the ridged vertex part 68b3 positioned between the side corresponding to the locking part 68b1 and the side corresponding to the sloping part 68b2, is an acute angle, and the vertex positioned between the side opposing the ridged vertex part 68b3 and the side corresponding to the locking part 68b1 is nearly at a right angle. In addition, in the initial state where the card 101 is not yet inserted, the locking main body 68a and the surface of the operating part 68c are almost flush with the side panel part 64 of the periphery.

Figure 4:
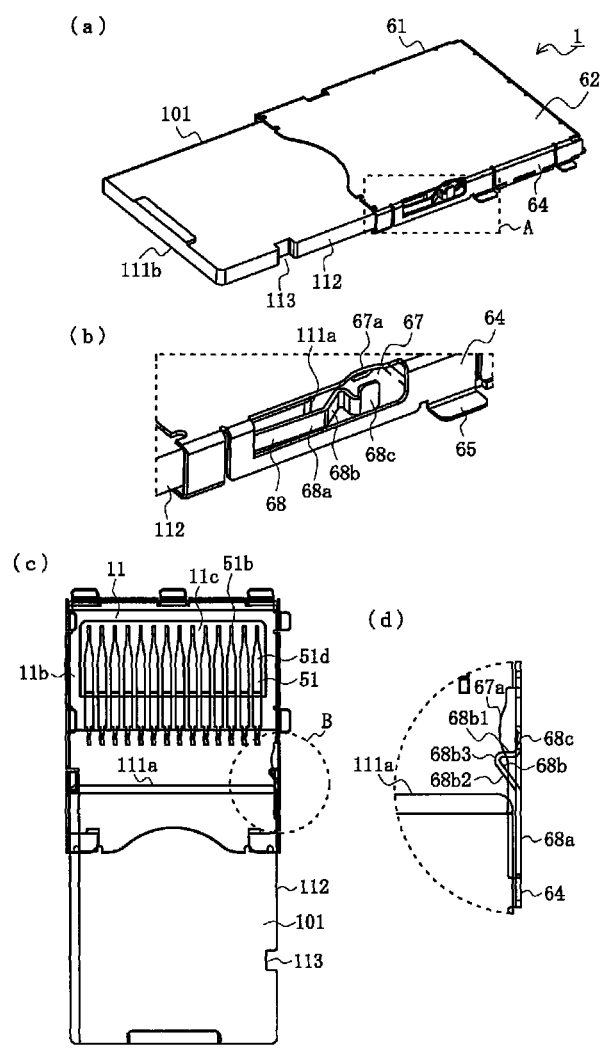
FIG. 4 is a set of drawings illustrating a midway state of inserting the card into the card connector of FIG. 1, wherein (a) is a perspective view, (b) is an enlarged view of the A part in (a), (c) is a perspective plan view and (d) is an enlarged view of the B part in (c)
Figure 5:
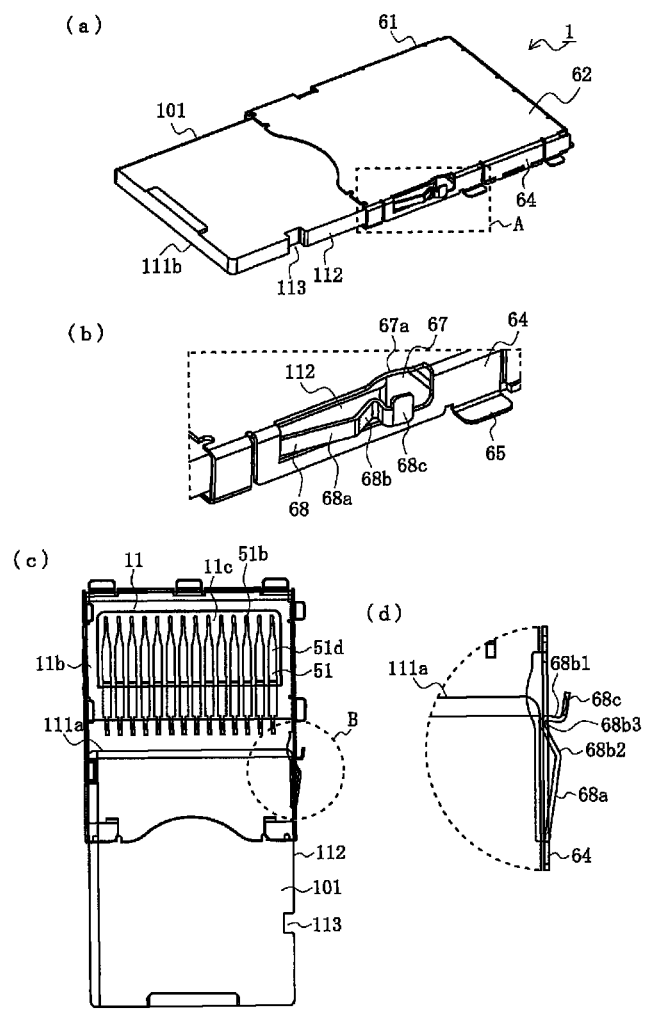
FIG. 5 is another set of drawings illustrating a midway state of inserting the card into the card connector of FIG. 1, wherein (a) is a perspective view, (b) is an enlarged view of the A part in (a), (c) is a perspective plan view and (d) is an enlarged view of the B part in (c)
Figure 6:
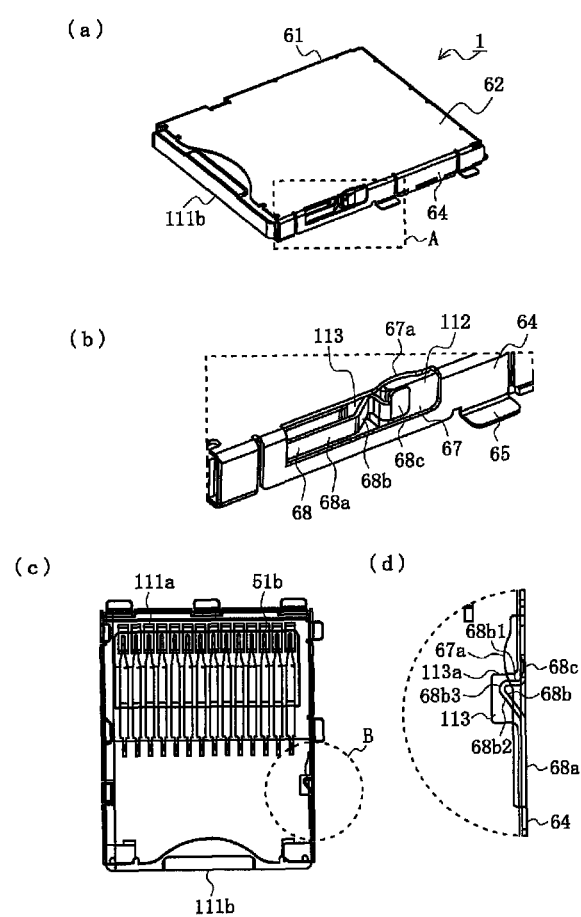
FIG. 6 is a set of drawings illustrating the state where the card is inserted into the card connector of FIG. 1, wherein (a) is a perspective view, (b) is an enlarged view of the A part in (a), (c) is a perspective plan view and (d) is an enlarged view of the B part in (c)

Further, as illustrated in (b) in FIGS. 4-6, the upper edge of the operating part 68c of the locking member 68 is placed higher than the upper edge of the locking main body 68a and locking ridged part 68b. In other words, a portion of the operating part 68c protrudes outward (more specifically, upward) more than the locking main body 68a and locking ridged part 68b. Furthermore, the operating recessed part 67a is formed in an area that corresponds to the operating part 68c in the opening 67 with a larger opening. Accordingly, the operating part 68c may be easily controlled.

To begin with, the card 101 is inserted into the card housing space formed between the housing 11 and the shell 61 from the front side (lower left side in FIG. 4(a)) of the card connector 1. In addition, the card 101 is inserted in the position so that the surface on which the contact pad 151 is arranged opposes the bottom panel part 11b of the housing 11, the surface on which the contact pad 151 is not arranged opposes the top panel part 62 of the shell 61, and the front end 111*a* faces toward the back wall part 11*a*.

Thereby, the card 101 proceeds along the side edge 112 where the recessed part 113 is formed. In other words, along the right side edge 112 there is the side panel part 64 where the locking member 68 is formed in the shell 61, while along the other side edge 112, that is the left side edge 112, there is the side panel part 64 where the locking member is not formed in the shell 61. In short, the card 101 proceeds in the manner where both left and right side-edges are guided by the side panel part 64 on both the left and right sides in the shell 61. In addition, FIG. 4 illustrates the initial stage in the inserting process of the card 101, and it illustrates the state where only the front end 111*a* and its proximity are inserted into the card housing space, and it illustrates the state when the front end 111*a* reaches the near side of the locking ridged part 68*b* of the locking member 68.

Subsequently, when the card 101 is pushed in further from the state illustrated in FIG. 4, the right side edge 112 of the card 101 abuts the locking ridged part 68*b* of the locking member 68, and as illustrated in FIG. 5, the locking member 68 displaces to the outside direction (right direction in FIGS. 5(*c*) and (*d*)) of the shell 61. When the right side edge 112 of the card 101 abuts the locking ridged part 68*b* of the locking member 68, the locking member 68 can be smoothly displaced to the outside direction of the shell 61 due to abutting the sloping part 68*b*2 first. Accordingly, the card 101 can proceed without receiving much resistance from the locking member 68, and is easily pushed in the card 101.

Moreover, as for the proceeding direction of the card 101, the locking ridged part 68*b* is positioned more to the rear side than the part where the locking main body 68*a* is connected to the side panel part 64. In other words, the locking ridged part 68*b* is placed in the trailing side of the locking member 68 that is the cantilever leaf spring member. Therefore, the card 101 can displace the locking ridged part 68*b* to the outside direction of the shell 61 without receiving much resistance. Accordingly, the card 101 can proceed extremely smoothly, and is pushed in very easily.

Next, when the card 101 is pushed in further from the state illustrated in FIG. 5, the front end 111*a* of the card 101 either abuts or draws near the back wall part 11*a* of the housing 11 as well as the side panel part 64 of the back side of the shell 61 to be in the state illustrated in FIG. 6; and thus completing the insertion of the card 101 into the card connector 1. With this state, the contact part 51*b* of the corresponding terminal 51 contacts each of the contact pads 151 of the card 101 to be electrically connected. Further, nearly the entire surface of the card 101 is covered by the top panel part 62 of the shell 61, and near the front surface of the side edges 112 of both the left and right sides of the card 101 either abuts or draws near the side panel parts 64 of both the left and right sides in the shell 61. Accordingly, the position of the card 101 within the card connector 1 is stabilized, and the electrical connection between the contact pad 151 and the terminal 51 can be stably maintained.

Further, a portion that is about a half of the rear end 111*b* side of the card 101 is biased upward by the card retention tab 66, and a portion that is about a half of the front end 111*a* side of the card 101 is biased upward by the terminals 51, so nearly the entire top surface of the card 101 is compressed by the top panel part 62 of the shell 61. Therefore, the position of the card 101 within the card connector 1 is further stabilized.

Furthermore, the locking ridged part 68*b* of the locking member 68 is fit to engage with the recessed part 113 formed in the side edge 112 of the card 101. Therefore, the card 101 is securely locked and held within the card connector 1.

As illustrated in FIGS. 6(*d*) and 7(*b*), the recessed part 113 is provided with a lock receiving part 113*a* that is a nearly orthogonal to the side edge 112, and the shape is nearly a rectangular shape when viewed from above. The lock receiving part 113*a* is a surface near the front end 111*a* in the recessed part 113, and an area opposing the locking part 68*b*1 in a state where the locking ridged part 68*b* fits into the recessed part 113.

Figure 7:
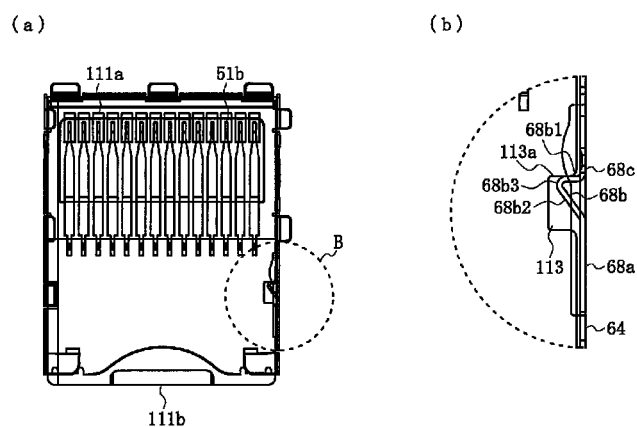
FIG. 7 is a set of drawings illustrating the state where the card inserted into the card connector of FIG. 1 is locked, wherein (a) is a perspective plan view and (b) is an enlarged view of the B part in (a)

Therefore, if a shock or impact is applied to the electronic device, or if an external force is applied to the card 101 in a direction to remove it from the card housing space by pulling the card 101, as shown in FIG. 7, the card 101 can not move any farther in the opposite direction to the insertion direction because the lock receiving part 113*a* of the recessed part 113 is abut and locked in the locking part 68*b*1 of the locking ridge part 68*b*. Accordingly, this not only can prevent disconnection from the card connector 1 by coming out from the card housing space, but can also prevent the release of the contact state between the contact pad 151 and the terminals 51.

When the locking ridged part 68*b* is fit into the recessed part 113, the surfaces of the locking main body 68*a* and the operating part 68*c* are almost flush with the panel part 64 of the periphery in a similar manner to the initial state. Accordingly, the locking part 68*b*1 that is nearly orthogonal to the surfaces of the locking main body part 68*a* and the operating part 68*c* is nearly orthogonal to the side panel part 64. Meanwhile, the side edge 112 of the card 101 is nearly parallel to the side panel part 64 due to being guided by the side panel part 64. Accordingly, the lock receiving part 113*a* that is nearly orthogonal to the side edge 112 is nearly orthogonal to the side panel part 64. Thereby the locking part 68*b*1 of the locking ridged part 68*b* and the lock receiving part 113*a* of the recessed part 113 are mutually parallel and at the same time nearly orthogonal to the side panel part 64, in other words, the locked state cannot be released due to the near orthogonal insertion direction.

Furthermore, because the locking ridged part 68*b* is placed farther rearward than the area where the locking main body 68*a* is connected to the side panel part 64 in regards to the proceeding direction of the card 101, the locking main body 68*a* is placed farther to the front side than the area where the locking main body 68*a* is connected to the side panel part 64 in regards to the opposite direction to the proceeding direction of the card 101. In other words, when the card 101 is pulled out from the card housing space, the locking ridged part 68*b* is placed near the leading side of the locking member 68 that is the leaf spring member with a cantilever form. Therefore, when an external force in the retraction direction is applied to the card 101, a force in the penetration direction into the recessed part 113 acts on the locking ridged part 68*b*. In short, a force that displaces to the left side acts on the locking ridged part 68*b* in FIG. 7(*b*). Therefore, the locking ridged part 68*b* is not displaced to the outer direction of the shell 61, so the locked state between the locking part 68*b*1 of the locking ridged part 68*b* and the lock receiving part 113*a* of the recessed part 113 is not released.

In addition, when the card 101 is removed from the card connector 1, the operating part 68*c* is displaced in the outer direction of the shell 61 to release the locked state between the locking part 68*b*1 of the locking ridged part 68*b* and the lock receiving part 113*a* of the recessed part 113. Subsequently, the near rear end 111*b* of the card 101 is held, and pulls out the card 101 from the card housing space while keeping the operating part 68*c* displaced to the outer direction of the shell 61. Accordingly, the card 101 can be removed easily and quickly from the card connector 1.

As described above, in the present embodiment, the shell 61 is provided with the locking member 68 that locks the card 101 housed within the card housing space. The locking member 68 is a leaf spring member with a cantilever form that provides a locking main body part 68a which extends in the insertion direction of the card 101 integrally connected to the shell 61, and a locking ridged part 68b connected to the tip of the locking main body part 68a which protrudes inward of the shell 61. The locking ridged part 68b inserts into the recessed part 113 formed on the side edge 112 of the card 101 that is housed in the card housing space.

By so doing, the card connector 1 can have a small size and simple configuration, and yet the card 101 that is housed by inserting can be securely positioned, and also securely held. Further, a highly reliable card connector 1 can be obtained with a few parts, easy manufacturing, and low cost.

Further, the locking ridged part 68b includes a locking part 68b1 that extends in an orthogonal direction to insertion direction of the card 101, and the locking part 68b1 opposes the lock receiving part 113a that is a surface near the front end 111a of the card 101 in the recessed part 113. Accordingly, the locked state between the locking part 68b1 and the recessed part 113 can not be released.

Furthermore, the lock receiving part 113a in the recessed part 113 extends in the direction orthogonal to the side edge 112 of the card 101. Accordingly, the locked state between the locking part 68b1 and he recessed part 113 is further secured.

Moreover, the locking member 68 is provided with the operating part 68c hat is connected to the tip of the locking ridged part 68b, and a part of the operating part 68c protrudes outward more than the locking member 68 and the locking ridged part 68b. Accordingly, the user can easily operate the operating part 68c by a finger or the like to displace the operating part 68c in the outer direction of the shell 61 so that the locked state between the locking part 68b1 of the locking ridged part 68b and the lock receiving part 113a of the recessed part 113 can be released. Therefore, the card 101 can be removed easily and quickly from the card connector 1.

Next, a description will be given of the second embodiment of the Present Disclosure. In addition, the description will omit the explanation for those items with the same structure as the first embodiment but will give the same reference number. Further, regarding the same operation and effects as the first embodiment, such description will be also omitted.

In the present embodiment, the locking member 68 is formed not on the side panel part 64 of the shell 61, but on the top panel part 62. In an example illustrated, only one locking member 68 is formed on the boundary portion with the right side panel part 64 in the top panel part 62. The locking member 68 is provided with a locking main body 68a that is a leaf spring member with a cantilever form that is formed by cutting and bending a part of the top panel part 62, and its base edge part is integrally connected to the top panel part 62 and extends toward the back wall part 11a side (in the insertion direction of the card 101); a locking ridged part 68b formed by bending so as to protrude inward of the shell 61 (more specifically, downward) and is connected to the tip of the locking main body 68a; and a plate-shaped operating part 68c that is connected to the tip of the locking ridged part 68b. The operating part 68c is preferably formed so as to be almost flush with the locking main body 68a. In addition, the opening 67 is formed so as to spread over the top panel part 62 and the right side panel part 64. Also, the locking member 68 is elastically displaced in an orthogonal direction to the top panel part 62.

Figure 8:
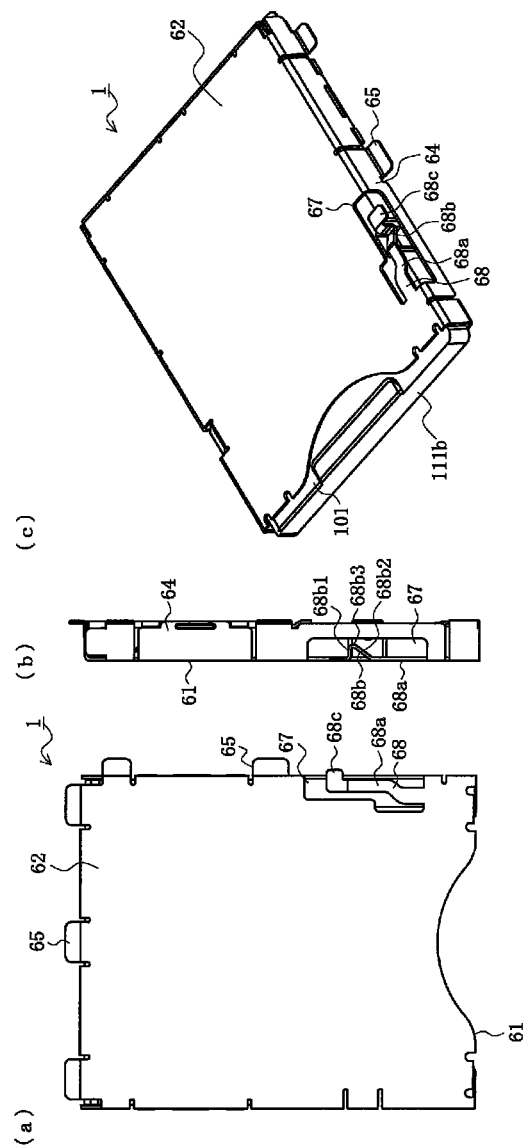
FIG. 8 is a set of drawings illustrating another card connector according to the Present Disclosure, wherein (a) is a top surface view, (b) is a side surface view and (c) is a view from diagonally above in the state where the card is inserted.
Figure 9:
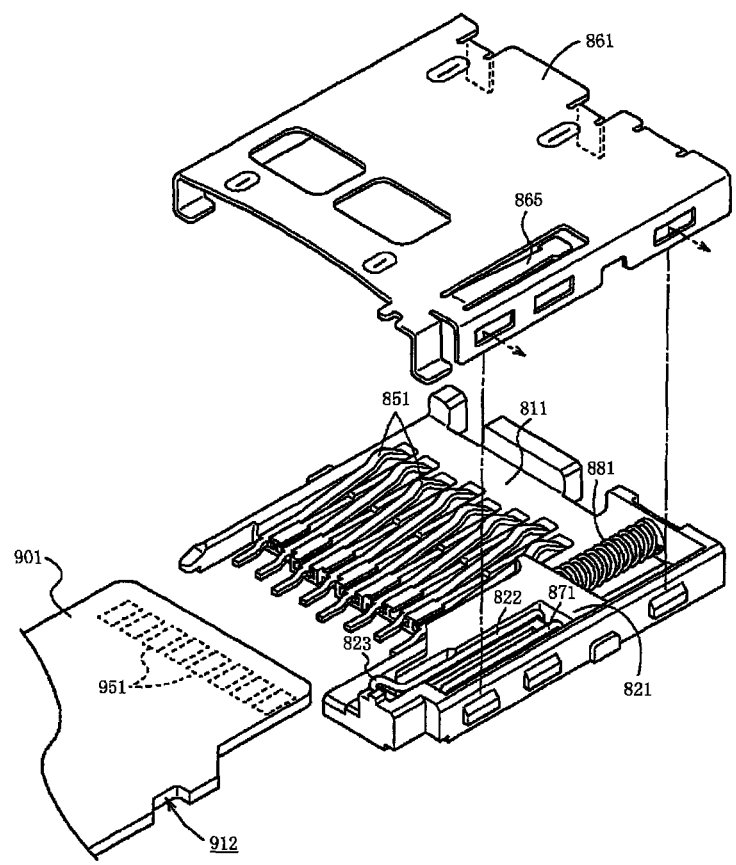
FIG. 9 is a view illustrating a conventional card connector.

Accordingly, as shown in FIG. 8(b), the locking ridged part 68b of the locking member 68 is engaged from above by fitting into the recessed part 113 formed in the side edge 112 of the card 101 that is inserted in the card housing space between the housing 11 and the shell 61. Therefore, the card 101 can be securely locked and held. In addition, even in the initial state where the card 101 is not yet inserted, or in the state where the card 101 is inserted, the locking main body 68a and the surface of the operating part 68c are almost flush with the top panel part 62 of the periphery.

Further, as illustrated in FIG. 8(a), the right edge of the operating part 68c of the locking member 68 is placed more to the right side than the right side panel part 64. In other words, a portion of the operating part 68c protrudes outward more than the locking main body 68a and locking ridged part 68b. Accordingly, the operating part 68c can easily be controlled. In addition, when the card 101 is removed from the card connector 1, the operating part 68c is displaced upward of the shell 61 by using a finger or the like by the user to release the locked state between the locking part 68b1 of the locking ridged part 68b and the lock receiving part 113a of the recessed part 113.

Further, the structure and operation of other points are the same as the first embodiment, therefore descriptions thereof are omitted.

While a preferred embodiment of the Present Disclosure is shown and described, it is envisioned that those skilled in the art may devise various modifications without departing from the spirit and scope of the foregoing Description and the appended Claims.

What is claimed is:

1. A card connector, the card connector comprising:
   a housing, the housing adapted to house a card, the card including a terminal member;
   a connection terminal, the connection terminal being attached to the housing and contacting the terminal member; and
   a cover member, the cover member being attached to the housing and forming a card housing space, the cover member including a locking member, the locking member being adapted to lock the card housed within the card housing space, the locking member being a leaf spring member and having a cantilever form, the locking member including a locking main body part, a locking ridged part and an operating part, the locking main body part being integrally connected to the cover member and extending in the insertion direction of the card, the locking ridged part being connected to the tip of the locking main body part and protruding inward toward the cover member, the locking ridged part being inserted into a recessed part, the recessed part being formed on the edge of the card housed in the card housing space, the operating part being connected to the tip of the locking ridged part, a part of the operating part protruding more outward than the locking body main part and the locking ridged part.

2. The card connector of claim 1, wherein the locking ridged part includes a latching part, the latching part extending in a direction orthogonal to the insertion direction of the card.

3. The card connector of claim 2, wherein the latching part opposes a surface near the front end of the card in the recessed part.

4. The card connector of claim 3, wherein the surface near the front end of the card in the recessed part extends in a direction orthogonal to the card edge.

5. The card connector of claim 2, wherein the locking member is formed on a side panel part of the cover member.

6. The card connector of claim 5, wherein the locking main body part and locking ridged part are flush with the side panel part.

7. The card connector of claim 2, wherein the locking member is formed on the top panel part of the cover member.

8. The card connector of claim 7, wherein the locking main body part and the locking ridged part are flush with the top panel.

9. The card connector of claim 3, wherein the locking member is formed on a side panel part of the cover member.

10. The card connector of claim 9, wherein the locking main body part and locking ridged part are flush with the side panel part.

11. The card connector according to claim 3, wherein the locking member is formed on the top panel part of the cover member.

12. The card connector of claim 11, wherein the locking main body part and the locking ridged part are flush with the top panel.

13. The card connector of claim 4, wherein the locking member is formed on a side panel part of the cover member.

14. The card connector of claim 13, wherein the locking main body part and locking ridged part are flush with the side panel part.

15. The card connector of claim 4, wherein the locking member is formed on the top panel part of the cover member.

16. The card connector of claim 15, wherein the locking main body part and the locking ridged part are flush with the top panel.

17. The card connector of claim 1, wherein the locking member is formed on a side panel part of the cover member.

18. The card connector of claim 17, wherein the locking main body part and locking ridged part are flush with the side panel part.

19. The card connector of claim 1, wherein the locking member is formed on the top panel part of the cover member.

20. The card connector of claim 19, wherein the locking main body part and the locking ridged part are flush with the top panel.

* * * * *